United States Patent
Ottestad

(10) Patent No.: US 10,126,758 B2
(45) Date of Patent: Nov. 13, 2018

(54) FLOW CONTROL VALVE

(71) Applicant: OBS Technology AS, Husøysund (NO)

(72) Inventor: Nils Terje Ottestad, Husøysund (NO)

(73) Assignee: OBS Technology AS, Husoysund (NO)

( * ) Notice: Subject to any disclaimer, the term of this patent is extended or adjusted under 35 U.S.C. 154(b) by 0 days.

(21) Appl. No.: 15/026,305

(22) PCT Filed: Sep. 25, 2014

(86) PCT No.: PCT/NO2014/050176
§ 371 (c)(1),
(2) Date: Mar. 31, 2016

(87) PCT Pub. No.: WO2015/050457
PCT Pub. Date: Apr. 9, 2015

(65) Prior Publication Data
US 2016/0224031 A1    Aug. 4, 2016

(30) Foreign Application Priority Data

Oct. 5, 2013    (NO) .................................. 20131336
Oct. 23, 2013   (NO) .................................. 20131401

(51) Int. Cl.
*F16K 31/12*    (2006.01)
*G05D 7/01*    (2006.01)
(Continued)

(52) U.S. Cl.
CPC ....... *G05D 7/0133* (2013.01); *F16K 31/1221* (2013.01); *G05D 16/10* (2013.01); *Y10T 137/7788* (2015.04)

(58) Field of Classification Search
CPC ......... Y10T 137/7754; Y10T 137/7762; Y10T 137/7788; Y10T 137/7795; Y10T 137/7797
See application file for complete search history.

(56) References Cited

U.S. PATENT DOCUMENTS 1,912,383 A * 6/1933 Pardee ................. G05D 7/0106
                                        137/505.12
3,911,947 A * 10/1975 Boxall .................... F16K 17/20
                                        137/505.14
(Continued)

FOREIGN PATENT DOCUMENTS

| EP | 1 110 132 B1 | 12/2002 |
| WO | 0011530 A1 | 3/2000 |
| WO | 2007127949 A2 | 11/2007 |

OTHER PUBLICATIONS

International Search Report for International Application PCT/NO2014/050176 dated Nov. 10, 2014.
(Continued)

*Primary Examiner* — R. K. Arundale
(74) *Attorney, Agent, or Firm* — Andrus Intellectual Property Law, LLP

(57) ABSTRACT

An adjustable flow-control valve is for controlling the flow from a fluid-supply unit. The control valve includes a pressure-control unit and a flow-control unit, a first inlet for connection to the fluid-supply unit, and an outlet. The pressure-control unit includes a first chamber (I) and a second chamber (II) separated by a first movable element which is cooperatively connected to a first preloading device, the first chamber being in fluid communication with the first inlet and with the flow-control unit, and the second chamber being in fluid communication with the outlet of the flow-control valve and including a second inlet in fluid communication with the flow-control unit. The flow-control unit includes a third chamber (III) and a fourth chamber (IV) separated by a second movable element which is cooperatively connected to a second preloading device.

9 Claims, 4 Drawing Sheets

(51) Int. Cl.
    *G05D 16/10*    (2006.01)
    *F16K 31/122*    (2006.01)

(56) References Cited

U.S. PATENT DOCUMENTS

| | | | | |
|---|---|---|---|---|
| 4,802,507 | A | * | 2/1989 | Willson .................. F23N 1/007 137/505.12 |
| 5,234,025 | A | | 8/1993 | Skoglund et al. |
| 5,301,713 | A | | 4/1994 | Skoglund |
| 5,427,139 | A | | 6/1995 | Hilton |
| 6,026,849 | A | * | 2/2000 | Thordarson .......... G05D 7/0106 137/501 |
| 2004/0099313 | A1 | * | 5/2004 | Gotthelf ................ G05D 16/18 137/505.39 |
| 2007/0289640 | A1 | * | 12/2007 | Kirchner ................ G05D 7/014 137/503 |

OTHER PUBLICATIONS

Written Opinion for International Application PCT/NO2014/050176 dated Nov. 10, 2014.

* cited by examiner

Prior Art

FLOW CONTROL VALVE

CROSS-REFERENCE TO RELATED APPLICATIONS

This application is the U.S. national stage application of International Application PCT/NO2014/050176, filed Sep. 25, 2014, which international application was published on Apr. 9, 2015, as International Publication WO2015/050457 in the English language. The international application is incorporated herein by reference, in entirety. The international application claims priority to Norwegian Patent Application No. 20131336, filed Oct. 5, 2013, which is incorporated herein by reference, in entirety, and Norwegian Patent Application No. 20131401, filed Oct. 23, 2013, which is incorporated herein by reference, in entirety.

TECHNICAL FIELD

The invention relates to a flow-control valve which, when connected to a supply of a pressurized fluid, is arranged to precisely and infinitely variably control the amount which is passing through the valve, and which may thereby be injected into various devices or processes.

The flow rate through this type of valves is preferably based on the fact that a defined mass flow is achieved when a fluid passes a fixed nozzle orifice with a constant pressure drop. The valve should be of a design that results in the flow rate being, in the main, unaffected by pressure variations at the inlet of the valve as well as at the outlet of the valve.

BACKGROUND

The invention has for its object to remedy or reduce at least one of the drawbacks of the prior art or at least provide a useful alternative to the prior art.

The flow-control valve according to the invention is primarily constructed for the injection of chemicals into oil wells or into various processes in in which the counter-pressure may be of a magnitude of several hundred bara and be varying over time. In the oil industry, there is an expressed need for flow-control valves that have better repeatability and better flow stability than the valves available today. This is particularly true when there is a need for injection rates down towards 2-3 litres per 24 hours. The invention concerned is provided to attend to this need and has, in that respect, demonstrated good properties. Generally, the invention is suitable for the flow control of gas as well as liquid, and its application is thus not limited to the oil industry or to fluid mediums. However, the description that follows is simplified in that reference is made only to fluids in liquid form.

SUMMARY OF THE INVENTION

The present invention provides a flow-control valve with improved repeatability and flow stability. The flow-control valve according to the invention is defined in the attached claims and in what follows.

In one aspect, the present invention provides an adjustable flow-control valve for controlling the flow from a fluid-supply unit, the flow-control valve including a pressure-control unit and a flow-control unit, a first inlet for connection to the fluid-supply unit, and an outlet, and the pressure-control unit including a first chamber and a second chamber separated by a first movable element which is cooperatively connected to a first preloading device, characterized by the first chamber being in fluid communication with the first inlet and with the flow-control unit, wherein a first valve assembly including a first control element is arranged between said inlet and the first chamber, the first control element is cooperatively connected to the first movable element, so that the first valve assembly is governed by the position of the first movable element so that fluid in the first chamber has a predetermined over-pressure in relation to the fluid pressure in the second chamber when in use, and the second chamber being in fluid communication with the outlet of the flow-control valve and including a second inlet in fluid communication with the flow-control unit; and the flow-control unit including a third chamber and a fourth chamber separated by a second movable element which is cooperatively connected to a second preloading device, wherein the third chamber is in fluid communication with the first chamber, the fourth chamber is in fluid communication with the first chamber via a nozzle and with the second chamber via a second valve assembly including a second control element, and the second control element is cooperatively connected to the second movable element so that the second valve assembly is governed by the position of the second movable element.

In one embodiment of a flow-control valve according to the invention, the first movable element and/or the second movable element comprises a piston.

In one embodiment of a flow-control valve according to the invention, the first pre-loading device applies a resistance to the first movable element against moving towards the second chamber. When in use, the first movable element will, in other words, be preloaded in a direction towards the first chamber.

In one embodiment of a flow-control valve according to the invention, the second pre-loading device applies a resistance to the second movable element against moving towards the fourth chamber. When in use, the second movable element will, in other words, be preloaded in a direction towards the third chamber.

In one embodiment of a flow-control valve according to the invention, the first pre-loading device and/or the second preloading device are/is a spring. Other possible preloading devices include a gas-filled cylinder-and-piston assembly, for example.

In one embodiment of a flow-control valve according to the invention, the second movable element cooperatively connected to a control device is capable of adjusting the distance between said element and the second valve assembly, and/or the preload of said element.

In one embodiment of a flow-control valve according to the invention, the control device includes a rotatable handle, the handle being connected to a shaft which is cooperatively connected to the second movable element.

In one embodiment of a flow-control valve according to the invention, the control device includes a sleeve which is cooperatively connected to the second movable element by a spring.

In one embodiment of a flow-control valve according to the invention, said valve includes a nozzle with at least a hole which is narrowed by an elongated element extending through it. The elongated element may be, for example, a wire or its equivalent.

A BRIEF DESCRIPTION OF THE DRAWINGS

For the further detailed explanation of the operation of a flow-control valve according to the invention, FIGS. 1-4 are taken as a basis, in which:

A DETAILED DESCRIPTION OF THE INVENTION

Generally, great challenges attach to designing flow-control valves that are going to operate at high pressures and control the flow level of a medium of low compressibility. In this situation, there is not normally a stable reference pressure that might be helpful to bring about a low and stable pressure drop across a nozzle orifice. The pressures that, basically, have to be dealt with are the supply pressure of the valve and the injection pressure (=the outlet pressure of the valve). These pressure levels may lie at several hundred bars and have unpredictable variations. To ensure a stable flow rate, it is important that the valve is not much affected by such variations, and that it has an inherent stability that prevents natural oscillations.

Generally, it is desirable to be able to have a low pressure drop across the nozzle. Otherwise, especially low flow rates will require a very narrow nozzle orifice, which creates a considerable risk of the nozzle becoming blocked with contaminations. The pressure difference between the inlet and the outlet (=the injection line) of a flow-control valve is normally large, and the pressure drop to be maintained across the nozzle will be modest in relation thereto. This makes it necessary to have two control units incorporated in the valve: a flow-control unit controlling the pressure drop across the nozzle—that is to say the flow rate, and a pressure-control unit that is to control the other pressure conditions.

Figure 1:
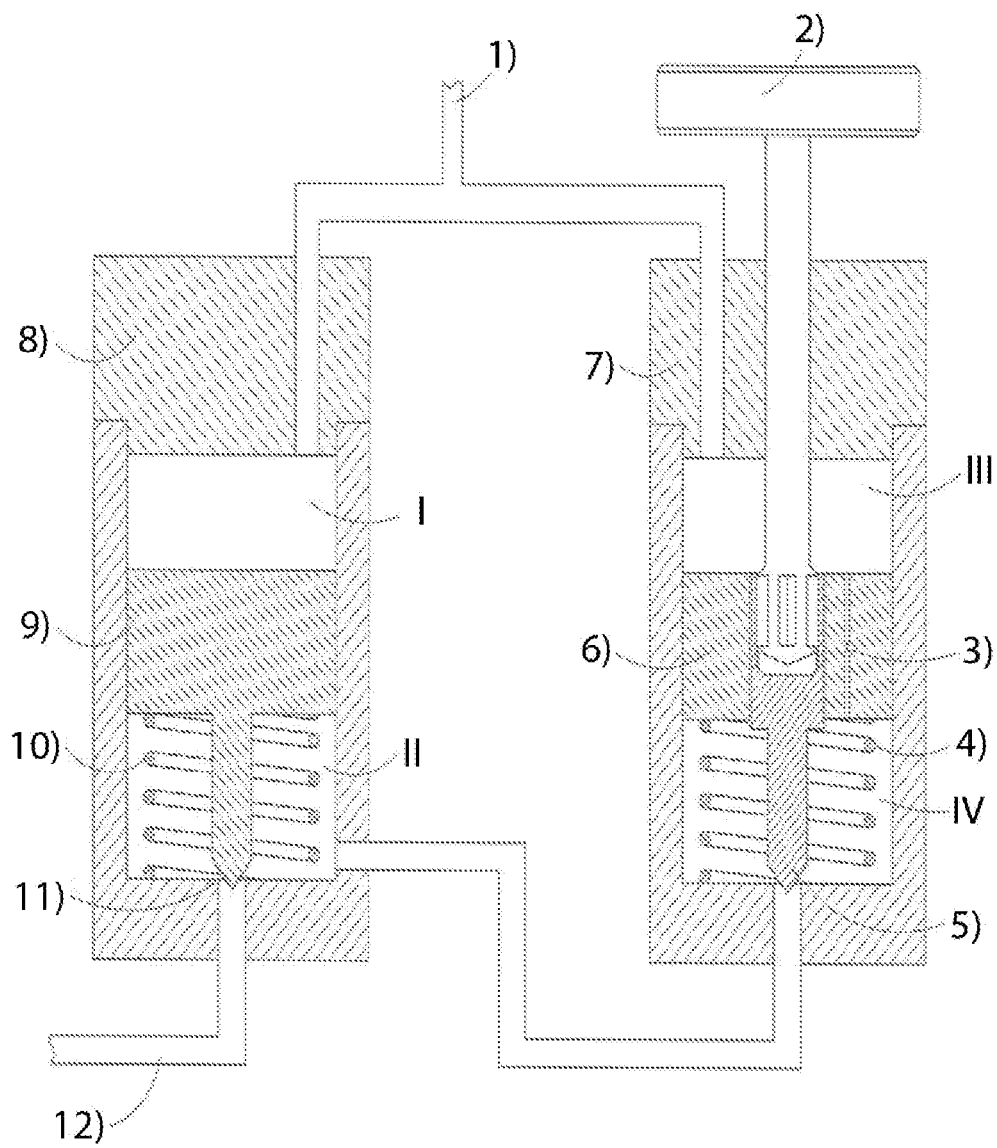
FIG. 1 shows a principle drawing of the cooperation between a flow-control unit and a pressure-control unit in a known embodiment of a flow-control valve.

FIG. 1 shows a principle drawing of a known flow-control valve, based on EP 1110132 (A1). Both the flow-control unit and the pressure-control unit in this valve use the supply pressure of the liquid (fluid) as the reference for their control functions. In their operation, these two units may be regarded as dump valves. Liquid supplied is directed through a nozzle 3 in the flow-control unit 7, in which an adjustment of the tension of a spring 4 controls a first valve assembly 5 so that the pressure drop across the nozzle 3 corresponds to the desired flow level—whereupon this liquid flow is directed into the pressure-control unit 8 where the remaining pressure drop takes place, this liquid flow being dumped on to the outlet 12 via a second valve assembly 11.

A desired flow rate of 2 litres/24 hours corresponds to 0.02 cm$^3$ per second. This means that valve movements are extremely small, and it is therefore important that the flow-control unit 7 and the pressure-control unit 8 can operate, to the greatest extent possible, as independent units—which cannot disturbingly affect each other's function. In the development of the invention concerned, great importance has been attached to this.

Figure 2:
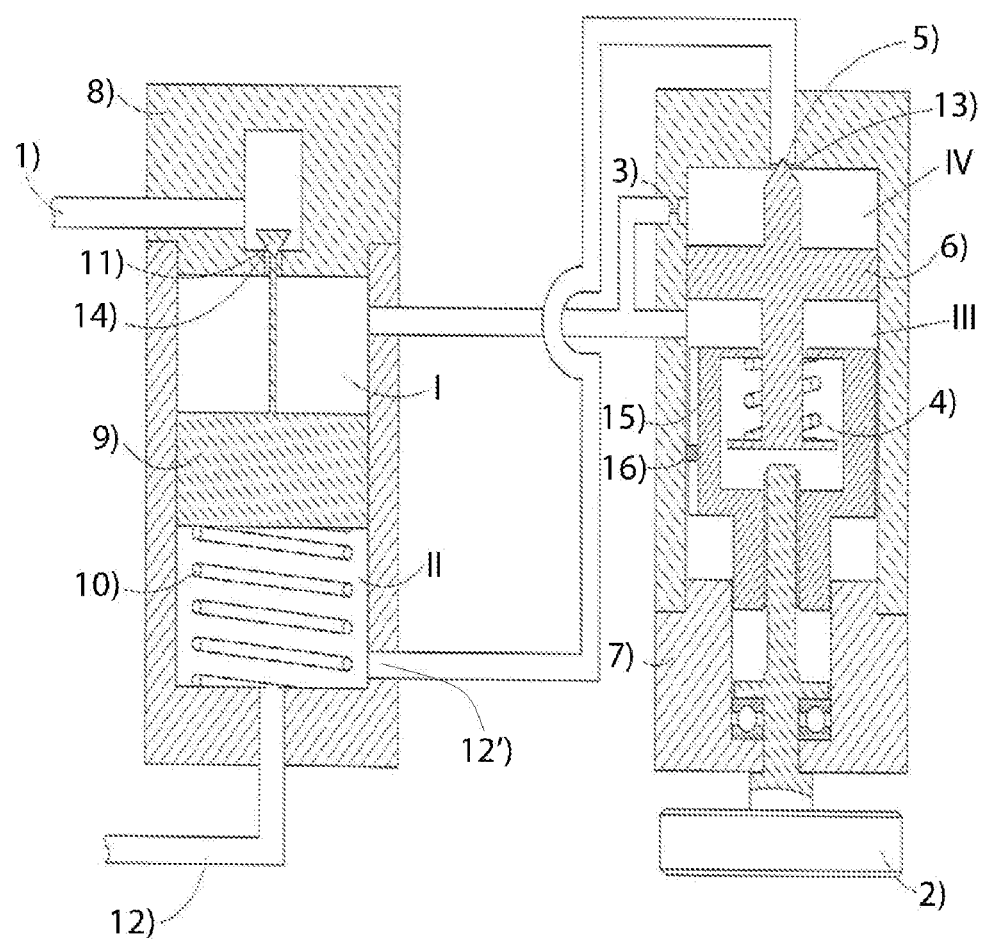
FIG. 2 shows a principle drawing of the cooperation between a pressure-control unit and a flow-control unit according to the present invention.

FIG. 2 shows a principle drawing of a flow-control valve according to the invention. Components with functions corresponding to those in FIG. 1 have been given the same reference numerals. The pressure-control unit 8 functions as a conventional pressure-control valve, which is arranged to keep the pressure in a first chamber (intermediate chamber) I at roughly 5 bar overpressure in relation to the pressure at the outlet 12. The pressure in a second chamber II is controlled by a cooperation between a first, preloaded element 9 (here a leak-free, displaceable piston 9 acted on by a spring 10) and a control element (for example an actuating lever) on a valve assembly 11. A falling pressure in the second chamber II will mean that the preloaded element 9 is displaced upwards and compensates by opening to a limited supply of fluid from an inlet 1. A seat 14 in the valve assembly 11 has a small opening cross section compared to the dimension of the preloaded element 9 to make the pressure control as stable as possible. Pressure-reduction valves of this type will be based on metal-to-metal joints, which, by the use of present-day technology, give good reliability under conditions involving large pressure drops and low flow rates. The differential pressure that is brought about by means of the pressure-control unit 8 is used in its turn by the flow-control unit 7 to bring about a stable differential pressure across the nozzle 3 and thereby establish the desired flow rate. There is primarily a wish for a nozzle orifice that gives the desired variation in the flow rate within a differential pressure in the range of 0-1 bar to be taken as a basis. The point of departure being that the pressure reduction preferably brings about a differential pressure of 5 bar in relation to the pressure at the outlet 12, the total pressure drop across the flow-control unit 7 must be 5 bar as well, which means that the flow-control unit 7 must include a valve assembly that can absorb a pressure difference varying from 5 to 4 bar.

The principle of a design of the flow-control unit 7 appears from FIG. 2. This includes a second preloaded element 6 (here a leak-free displaceable piston 6 acted on by a spring 4) with a centrally arranged control element 5 for a second valve assembly, wherein the control element 5 may rest sealingly on a seat 13. The bottom side of the piston 6 defines a third chamber III which is in open fluid communication with the first chamber I of the pressure-control unit 8, whereas a fourth chamber IV above the piston 6 is in fluid communication with the first chamber I via a nozzle 3. The preloading device (the spring 4) is arranged to create a downward force on the piston 6. This force increases when an adjustment wheel 2 is rotated and a sleeve 15 is screwed downwards—a blocking 16 preventing the sleeve 15 from rotating. Correspondingly, the force is reduced as the adjustment wheel 2 is screwed the other way. This force seeks to pull the piston 6 downwards and thereby open the valve assembly by displacing the control element 5 away from the seat 13. The condition for this to happen is that the preload (spring tension) is sufficiently large to overcome the upward force produced against the piston 6 when the pressure in the fourth chamber IV is lower than that of the third chamber III. When the valve assembly 5, 13 is opened, liquid is released from the fourth chamber IV to the outlet 12 via a second inlet 12' in the second chamber II with the consequence that the pressure in the fourth chamber IV is reduced. This cooperation results in the pressure difference between the third chamber III and the fourth chamber IV stabilizing at a given level that is determined by the preload (tension of the spring 4). The pressure difference between these chambers III, IV is identical to the pressure drop across the nozzle 3, and an even supply of fluid from the first chamber I to the fourth chamber IV via the nozzle 3 is thereby achieved. This supply is identical to the amount of fluid released from the fourth chamber IV to the outlet 12 and further out of the flow-control valve.

The displacement of the piston 6 during operation is very small at all times, so that minimal frictional forces will arise in a gasket, not shown, around the piston 6. The balance mentioned is also little affected by a certain amount of force being required for the control element 5 to be lifted up from its seat 13. This force is due to the pressure difference between the fourth chamber IV and the outlet 12 and may, as mentioned, vary from 5 to 4 bar. As the area of the seat 13 is typically 1/800 of the piston area 6 in size, this force will be without any real significance. The pressure difference across the nozzle 3 is therefore, in reality, uniquely determined by the set preloading (spring tension). In the embodiment that is shown in FIG. 2, the nozzle 3 is arranged on a channel connecting the first chamber I to the fourth chamber IV. This nozzle 3 could be arranged in the piston 6. However, it is advantageous for the nozzle to be easily replaceable— for example in order to change the control range. In a preferred design, it is therefore arranged in a valve housing so that it may be replaced without the flow-control valve thereby having to be disassembled (cf. FIG. 3).

The flow-control unit 7 has an important property in that it can go to a closed position independently of the pressure of the fluid. To go from the open position to the closed position, a liquid displacement from the fourth chamber IV to the third chamber III is required, and this may take place via the nozzle 3 irrespective of pressure conditions. It is desirable for the flow rate to be set to zero (=closed valve). To ensure this, a closing spring 18 that establishes a small extra closing force when the tension has been removed from the spring 4 is arranged in a preferred embodiment (cf. FIG. 3) of the flow-control unit 7.

Figure 3:
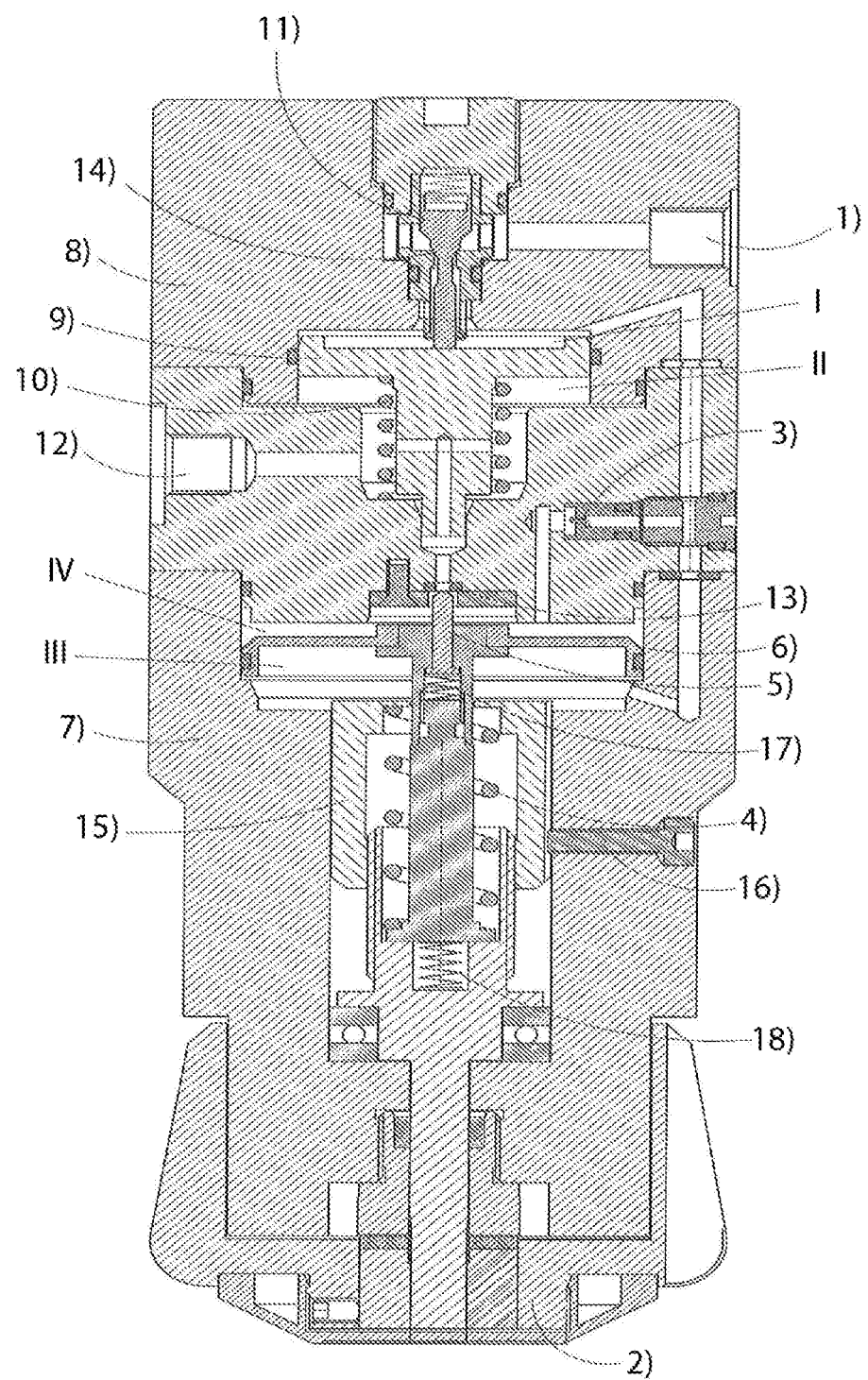
FIG. 3 shows an axial section of a complete flow-control valve according to the present invention.

FIG. 3 shows an axial section of the complete flow-control valve in a preferred embodiment. The reference numerals correspond to those of FIG. 2. A valve housing consists of three sections held together by through-going (not shown) screws. The seat 13 for the valve assembly 5 may with advantage be soft—for example, be based on the use of an O-ring. To ensure that the seat material is not subjected to damaging mechanical action, a soft spring 17 is arranged, making the control element 5 yield if the piston 6 should be forced towards its absolutely topmost position.

Figure 4A:
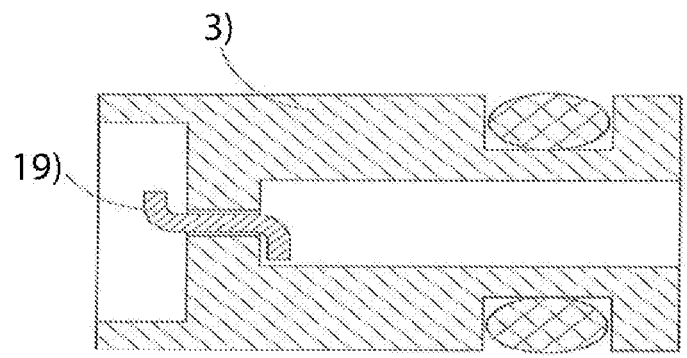
FIG. 4 shows axial sections, on a larger scale, of alternative embodiments of a nozzle device for use in a flow-control valve.
Figure 4B:
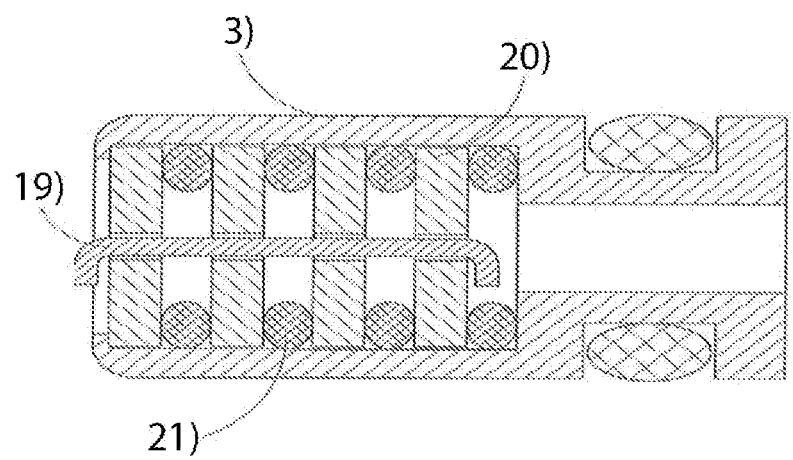

FIGS. 4a and 4b show relevant designs of the nozzle 3 for the flow-control unit 7. This type of designs is chosen in order to minimize the risk of the nozzle orifice becoming blocked—as, in that case, the flow-control valve would no longer function. If the nozzle orifice consists of a single orifice as a small circular hole, only a particle is required for the nozzle to become blocked. A nozzle orifice with the same numerical aperture, but being based on a larger hole which is narrowed into an annular orifice by, for example, a wire 19 extending through it, cannot be blocked in a corresponding manner.

Generally, it is desirable to be able to achieve a given flow rate with the use of a largest possible nozzle orifice. The design shown in FIG. 4b is thus a preferred design of the nozzle 3. This is based on a series of separate nozzles in the form of circular disc elements 20 with a centred nozzle orifice, which is narrowed by a shared wire 19 extending through them. Sealing devices 21 have been inserted between the disc elements 20, for example in the form of O-rings, to ensure that the fluid will not bypass the nozzle orifices.

The invention claimed is:
1. An adjustable flow-control valve for controlling the flow from a fluid-supply unit, the flow-control valve comprising a pressure-control unit and a flow-control unit, a first inlet for connection to the fluid-supply unit, and an outlet, the pressure-control unit including a first chamber (I) and a second chamber (II) separated by a first movable element which is cooperatively connected to a first preloading device, wherein
   the first chamber (I) is in fluid communication with the first inlet and with the flow-control unit, wherein
   a first valve assembly including a first control element is arranged between said inlet and the first chamber (I),
   the first control element is cooperatively connected to the first movable element so that the first valve assembly is governed by the position of the first movable element so that fluid in the first chamber (I) has a predetermined overpressure in relation to the fluid pressure in the second chamber (II) when in use, and
   the second chamber (II) is in fluid communication with the outlet and includes a second inlet in fluid communication with the flow-control unit; and
   the flow-control unit includes a third chamber (III) and a fourth chamber (IV) separated by a second movable element which is cooperatively connected to a second preloading device, wherein
   the third chamber (III) is in fluid communication with the first chamber (I),
   the fourth chamber (IV) is in fluid communication with the first chamber (I) via a nozzle and with the second chamber (II) via a second valve assembly including a second control element, and the second control element is cooperatively connected to the second movable element so that the second valve assembly is governed by the position of the second movable element.

2. The flow-control valve according to claim 1, wherein at least one of the first movable element and the second movable element comprises a piston.

3. The flow-control valve according to claim 1, wherein the first preloading device applies a resistance to the first movable element against moving towards the second chamber (II).

4. The flow-control valve according to claim 1, wherein the second preloading device applies a resistance to the second movable element against moving towards the fourth chamber (IV).

5. The flow-control valve according to of claim 1, wherein at least one of the first preloading device and the second preloading device is a spring.

6. The flow-control valve according to claim 1, wherein the second movable element is cooperatively connected to a control device capable of adjusting the distance between said element and at least one of the second valve assembly and the preload of said element.

7. The flow-control valve according to claim 6, wherein the control device includes a rotatable handle, the handle being connected to a shaft, which is cooperatively connected to the second movable element.

8. The flow-control valve according to claim 6, wherein the control device includes a sleeve cooperatively connected to the second movable element by a spring.

9. The flow-control valve according to claim 1, including a nozzle with at least a single nozzle including a hole, which is narrowed by an elongated element extending through it.

* * * * *